(No Model.)

D. W. COPELAND
AXLE BEARING.

No 496,346. Patented Apr. 25, 1893.

WITNESSES:
H. C. Chase,
E. Schoeneck.

INVENTOR
David W. Copeland
BY
Wilkinson & Parsons
ATTORNEYS.

THE NORRIS PETERS CO., PHOTO-LITHO., WASHINGTON, D. C.

UNITED STATES PATENT OFFICE.

DAVID W. COPELAND, OF SYRACUSE, NEW YORK.

AXLE-BEARING.

SPECIFICATION forming part of Letters Patent No. 496,346, dated April 25, 1893.

Application filed July 22, 1892. Serial No. 440,877. (No model.)

*To all whom it may concern:*

Be it known that I, DAVID W. COPELAND, of Syracuse, in the county of Onondaga, in the State of New York, have invented new and useful Improvements in Axle-Bearings, of which the following, taken in connection with the accompanying drawings, is a full, clear, and exact description.

My invention relates to improvements in journal bearings or boxes of the class set forth in my pending application, Serial No. 436,416, filed June 13, 1892, and has for its object the production of a simple, practical, efficient and durable construction capable of self-adjustment for preventing the usual binding of the axle when one of its ends is caused to assume an abnormal position; and to this end it consists, essentially, in an outer casing provided with a bearing rib projecting from its inner face, a sleeve within the casing adapted to encircle the axle, anti friction rollers having their bearing faces of greater width than the bearing face of said rib, said roller bearing faces being normally separated from the inner face of the casing and being provided with grooves for receiving the bearing rib.

The invention furthermore consists in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1:
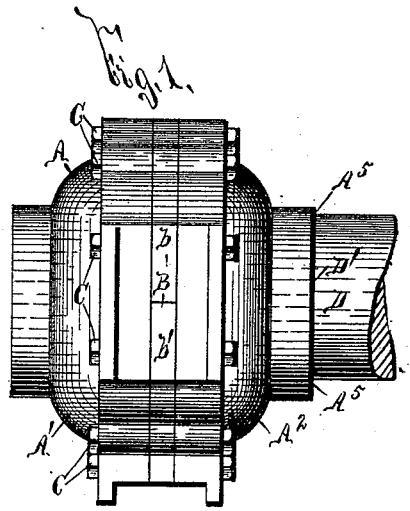
Figure 2:
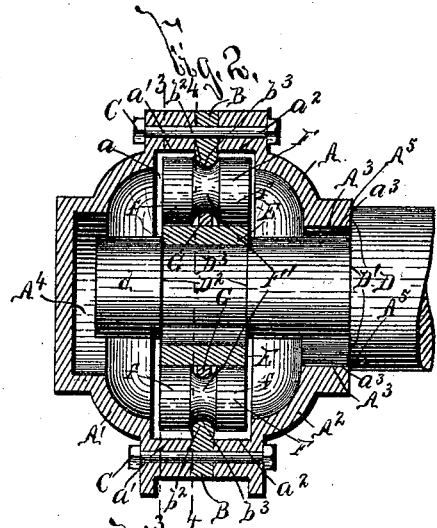
Figure 3:
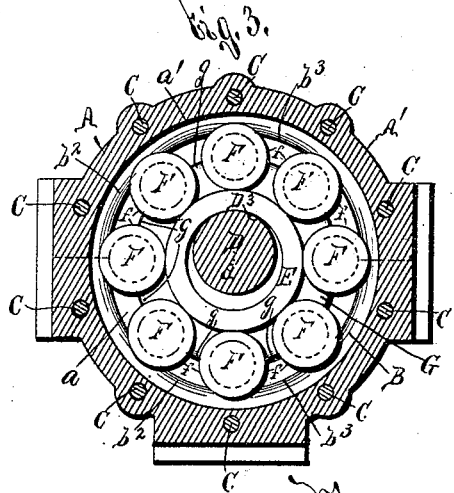
Figure 4:
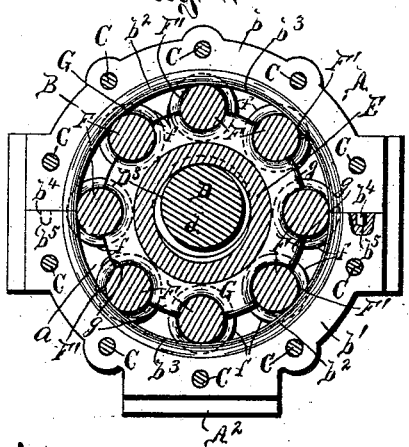
Figure 5:
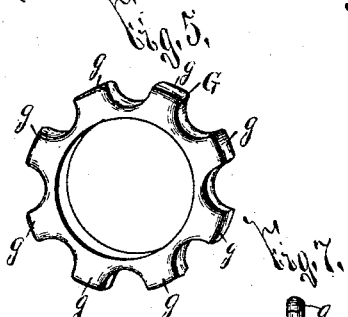
Figure 6:
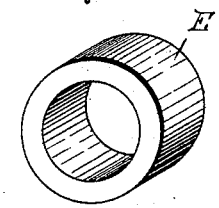

Figure 1 is a side elevation of my improved journal bearing, and the detached end of an axle mounted therein. Fig. 2 is a longitudinal vertical sectional view of the parts as shown at Fig. 1, the axle being in elevation. Figs. 3 and 4 are transverse vertical sectional views, taken, respectively, on lines 3—3, and 4—4, Fig. 2. Figs. 5 and 6 are isometric perspectives of the detached separator ring and the sleeve on the axle; and Fig. 7 is an edge view of the separator ring.

The bearing or box —A— is here shown as provided with a central chamber —$a$— and as composed of outer sections —A'—A²— and a central section —B—. The central section consists of two divisions —$b$—$b'$— and is formed with a bearing face —$b^3$— on its inner face which projects beyond the corresponding faces —$a'$—$a^2$— of the sections —A'—A²— and forms an inner bearing rib —$b^2$— on the interior of the box —A—. The opposite extremities of the sections —$b$— are formed with dowels —$b^4$— adapted to engage sockets —$b^5$— in the adjacent ends of the sections —$b'$—. Suitable clamps, as bolts —C—, firmly secure the separated sections of the casing together and cause the same to form a complete and solid whole.

—D— is an axle having its extremity —$d$— passed within the chamber —$a$— through an opening —A³— in the upright wall of the casing section —A²— which is formed of greater diameter than said axle end —$d$— for permitting the axle to adjust itself within the bearing or box without engaging the wall —$a^3$— of the opening —A³—. In the section —A'— is a closed chamber —A⁴— also formed of greater diameter than said axle for enabling the axle end to move freely with in said chamber.

—D'— is a shoulder upon the axle —D— bearing against the upright edge —A⁵— of the outer wall of the inner casing section —A²—.

—E— is a sleeve encircling a portion of the end of the axle —D— within the chamber —$a$— and as this sleeve must be prevented from lengthwise movement upon the axle, it enters between annular shoulders —D²— formed thereupon by an annular groove —D³—. The sleeve —E— is consequently of greater diameter than that portion of the axle encircled thereby and these parts have a rolling movement, thereby reducing to a minimum the amount of bearing of the axle upon the sleeve and the amount of friction produced by the turning of the axle. Instead of preventing the sleeve from lengthwise movement, upon the axle by mounting the same in a groove in said axle, it is evident that ribs or arms may be formed upon the inner upright walls of the outer sections of the casing of said bearing for engaging the edges of said ring.

—F— represents anti friction rollers arranged in a series between the sleeve —E— and the inner face of the casing —A—. The bearing face —f— of each of these rollers is considerably wider than the bearing face —b³— of the rib —b²—and is adapted to bear against the face of the sleeve —E—.

As is clearly seen at Figs. 2 and 3, the rollers —F— do not bear against the inner faces of the outer casing sections —A'—A²—, but considerable space intervenes between said rollers and inner faces.

The rollers —F— are provided with grooves —F'— arranged midway between their extremities and formed of rounding cross section for receiving the rib —b²—. By arranging the grooves —F'— between the opposite extremities of the rollers —F— their extremities have a bearing upon the sleeve —E— and the rollers are prevented from longitudinal movement on the axle end —d— and are free to adjust themselves as the axle end is elevated, depressed, retracted or advanced. This adjustment of the rollers would not be permitted, however, if their opposite extremities engaged the adjacent face of the outer casing and also engaged the sleeve —E— and is effected by mounting and supporting the rollers as just described. Moreover, by providing my bearing with the sleeve —E— the wear upon the axle is greatly reduced, as previously set forth, and the sleeve, when worn, may be readily removed and replaced without the exercise of skill, and with but a minimum amount of inconvenience and labor.

—G— is a divider for preventing contact of adjacent rollers. As preferably constructed, this divider consists of a ring encircling the sleeve —E— and formed with projecting peripheral arms —g— having their sides of rounding cross section, interposed between the adjacent rollers —F— and registered with the grooves —F'— in said rollers.

In operation, the end —d— of the axle —D— is passed through the inner section —A²— of the bearing —A—, the sleeve —E— is then mounted upon the axle, and the divider —G— upon the sleeve, the rollers —F— are then placed in relative position around the divider, the sections —b'—b'— of the central casing section —B— are registered with the grooves —F'— in the rollers, the outer section —A'— is placed in position, and the clamps —C— are actuated to draw the sections of the outer casing firmly against each other.

The parts of my invention are simple in construction, easily assembled and replaced and the entire device forms a highly efficient and durable journal box which automatically adjusts itself to an abnormal position of the axle without liability of cramping the anti friction rollers and unduly wearing the journal bearing. It will be evident, however, that the detail construction and arrangement of the parts of my bearing may be somewhat changed from that shown and described without departing from the spirit of my invention.

Having thus fully described my invention, what I claim as new, and desire to secure by Letters Patent, is—

1. The herein described roller bearing, the same comprising an outer casing provided with an annular bearing rib projecting from its inner face and formed of rounding cross section, a sleeve within said casing, anti friction rollers interposed between said sleeve and bearing rib, and having bearing faces of greater width than the bearing face of said rib, and said rollers having their bearing faces normally separated from the inner face of the casing and each provided with a groove for receiving the bearing rib, whereby the rollers have an adjustable movement on said rib, substantially as and for the purpose set forth.

2. The herein described roller bearing, the same comprising an outer casing provided with an annular bearing rib on its inner face, a sleeve within said casing, anti friction rollers interposed between said sleeve and bearing rib and having bearing faces of greater width than the bearing face of said rib, rollers having their bearing faces normally separated from the inner face of the casing and each provided with a groove for receiving the bearing rib, whereby the rollers have an adjustable movement on said rib, and a separator between the sleeve and bearing rib for preventing the adjacent rollers from contacting with each other.

3. In combination, an axle, an outer casing provided with an annular bearing rib on its inner face, a bearing sleeve encircling the axle and formed of greater diameter than the portion of said axle encircled by the sleeve, anti friction rollers interposed between the sleeve and the bearing rib formed with bearing faces of greater width than the bearing face of said rib, said rollers being formed with bearing faces normally separated from the inner face of the casing and having each provided with the groove for receiving the bearing rib, whereby the rollers have an independent adjustable movement on said rib, and a separator for preventing the adjacent rollers from contacting with each other, substantially as and for the purpose set forth.

In testimony whereof I have hereunto signed my name, in the presence of two attesting witnesses, at Syracuse, in the county of Onondaga, in the State of New York, this 14th day of July, 1892.

DAVID W. COPELAND.

Witnesses:
CLARK H. NORTON,
L. M. BAXTER.